(12) United States Patent
Ferrel et al.

(10) Patent No.: US 10,967,819 B2
(45) Date of Patent: Apr. 6, 2021

(54) DYNAMIC CONTROL OF ON-BOARD GENERATOR INVERTER INPUT POWER

(71) Applicant: FORD GLOBAL TECHNOLOGIES, LLC, Dearborn, MI (US)

(72) Inventors: Mark J. Ferrel, Brighton, MI (US); Mateusz Zadrozny, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/102,915

(22) Filed: Aug. 14, 2018

(65) Prior Publication Data
US 2020/0055473 A1  Feb. 20, 2020

(51) Int. Cl.
| | |
|---|---|
| *B60L 1/00* | (2006.01) |
| *B60R 16/033* | (2006.01) |
| *H02J 1/10* | (2006.01) |
| *B60L 7/14* | (2006.01) |
| *B60L 50/16* | (2019.01) |

(52) U.S. Cl.
CPC ............ *B60R 16/033* (2013.01); *B60L 7/14* (2013.01); *B60L 50/16* (2019.02); *H02J 1/10* (2013.01); *H02J 1/106* (2020.01)

(58) Field of Classification Search
CPC ............ B60R 16/033; H02J 1/10; B60L 1/00
See application file for complete search history.

(56) References Cited

U.S. PATENT DOCUMENTS

| | | | |
|---|---|---|---|
| 7,635,922 B2 * | 12/2009 | Becker | F02D 29/06 290/40 C |
| 9,731,667 B2 | 8/2017 | Takaoka | |
| 9,919,612 B2 | 3/2018 | Mizuno et al. | |
| 2003/0085689 A1 * | 5/2003 | Berneis | H02J 7/1438 320/135 |
| 2009/0309416 A1 * | 12/2009 | Bose | B60W 10/08 307/9.1 |
| 2010/0138071 A1 * | 6/2010 | Becker | H02P 9/48 700/297 |
| 2014/0200763 A1 * | 7/2014 | Sisk | B60L 58/13 701/36 |
| 2019/0389406 A1 * | 12/2019 | Mancini | B60L 50/10 |

* cited by examiner

*Primary Examiner* — John D Walters
*Assistant Examiner* — James J Triggs
(74) *Attorney, Agent, or Firm* — Brooks Kushman PC; David Kelley

(57) ABSTRACT

A vehicle includes power outlets configured to receive power from an inverter. The vehicle includes power sources configured to supply power to the inverter and a plurality of electrical systems. A controller is programmed to, responsive to detecting a load connected to one of the power outlets, change a maximum power limit of the electrical systems by an amount associated with the one of the power outlets.

14 Claims, 3 Drawing Sheets

US 10,967,819 B2

DYNAMIC CONTROL OF ON-BOARD GENERATOR INVERTER INPUT POWER

TECHNICAL FIELD

This application generally relates to a system for operating a vehicle power system for supplying power to external devices.

BACKGROUND

Vehicles may be configured to provide a limited amount of power to external devices. For example, vehicles may provide one or more 12-Volt outlets for providing power to external devices. Power capability of these outlets is generally quite low. For example, a 10 Amp output at 12 Volts only consumes 120 W of power. Hybrid vehicles present additional opportunities for providing power to external devices. As hybrid vehicles can include increased power storage and generation capabilities, it becomes possible to provide higher levels of power to external devices. As more power can be provided to off-board devices, balancing on-board and off-board power requirements becomes more complex.

SUMMARY

A vehicle includes power outlets configured to receive power from an inverter. The vehicle further includes power sources configured to supply power to the inverter and a plurality of electrical systems. The vehicle further includes a controller programmed to, responsive to detecting a load connected to one of the power outlets, reduce a maximum power limit of the electrical systems by a maximum power associated with the one of the power outlets.

The controller may be further programmed to, responsive to detecting no loads connected to the power outlets, operate the electrical systems to increase the maximum power limit of the electrical systems. The controller may be further programmed to, responsive to a total decrease in the maximum power limit exceeding a maximum outlet power allocation, limit the total decrease in the maximum power limit to be the maximum outlet power allocation. The controller may be further programmed to process historical power consumption data for each of the power outlets and output an estimated future power consumption based on the historical power consumption data. The controller may be further programmed to operate the electrical systems to change the maximum power limit of the electrical systems according to the estimated future power consumption. The controller may be further programmed to generate the estimated future power consumption as a maximum power consumption value derived from the historical power consumption data over a predetermined time interval. The controller may be further programmed to generate the estimated future power consumption as an average power consumption value derived from the historical power consumption data over a predetermined interval. The maximum power may include a power provision efficiency factor to compensate for energy conversion efficiency between the power sources and the power outlets. The power provision efficiency factor may vary with temperature and current.

A vehicle includes power outlets configured to receive power provided by an inverter, and power sources configured to supply power to the inverter and a plurality of electrical systems. The vehicle further includes a controller programmed to, responsive to detecting a load connected to one of the power outlets, decrease a maximum power limit of the electrical systems by a predicted power consumption associated with the one of the power outlets.

The predicted power consumption may be based on historical power consumption data associated with the one of the power outlets. The predicted power consumption may be a maximum power consumption value derived from the historical power consumption data over a predetermined time interval. The predicted power consumption may be an average power consumption value derived from the historical power consumption data over a predetermined interval. The controller may be further programmed to, responsive to detecting a change of status to the one of the power outlets, decrease the maximum power limit of the electrical systems according to a maximum power associated with the one of the power outlets. The controller may be further programmed to include a power provision efficiency factor in the predicted power consumption.

A method includes, by a controller, operating a vehicle power system, configured to supply power to a plurality of electrical systems and an inverter coupled to a plurality of power outlets, to reserve an amount of power for the power outlets, and, responsive to detecting a load connected to one of the power outlets, decrease power available to the electrical systems by a predicted power consumption associated with the one of the power outlets.

The method may further include estimating, by the controller, the predicted power consumption as a maximum power consumption associated with the one of the power outlets. The method may further include estimating, by the controller, the predicted power consumption as a maximum power consumption value derived from historical power consumption data measured over a predetermined time interval. The method may further include estimating, by the controller, the predicted power consumption as an average power consumption value derived from historical power consumption data measured over a predetermined interval. The method may further include changing, by the controller, power available to the electrical systems according to a maximum power associated with the one of the power outlets responsive to detecting a change of status to the one of the power outlets.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
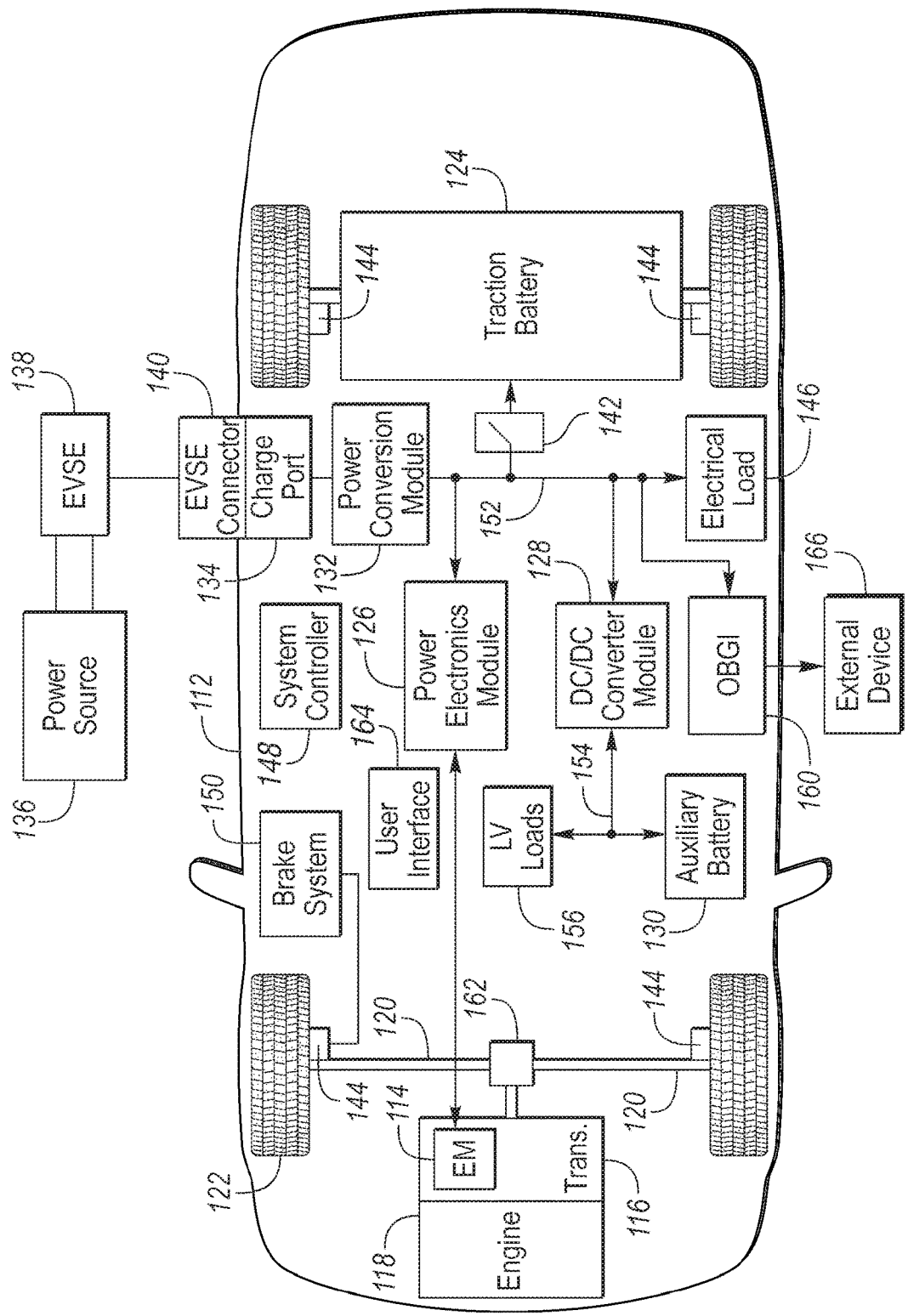
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 may be mechanically coupled to a differential 162 that is configured to adjust the speed of drive shafts 120 that are mechanically coupled to drive wheels 122 of the vehicle 112. The drive shafts 120 may be referred to as the drive axle. In some configurations, a clutch may be disposed between the hybrid transmission 116 and the differential 162. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be integrated with the traction battery 124. One or more power electronics modules 126 may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DC/DC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger 132. The charger 132 may condition the power supplied from the EVSE 138 to provide the proper voltage and current levels to the traction battery 124 and the high-voltage bus 152. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

The electrified vehicle 112 may include one or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components. Note that operations and procedures that are described herein may be implemented in one or more controllers. Implementation of features that may be described as being implemented by a particular controller is not necessarily limited to implementation by that particular controller. Functions may be distributed among multiple controllers communicating via the vehicle network.

The vehicle 112 may include a user interface 164 for interfacing with the operator. The user interface 164 may include display elements, such as lamps or a liquid-crystal display (LCD) module. The display elements may include a touch screen. The user interface 164 may further include input devices, such as switches, buttons, or touch-screen inputs.

The vehicle 112 may be configured to provide electrical power for external devices. The vehicle 112 may further include an On-Board Generator Inverter (OBGI) system 160. The OBGI system 160 may be a vehicle system that is configured to provide electrical power to one or more external devices 166. The OBGI system 160 may receive power from the high-voltage bus 152 and the traction battery 124. The OBGI system 160 may include power conversion circuitry to generate an output voltage and current for external devices that are connected to the OBGI system 160.

Figure 2:
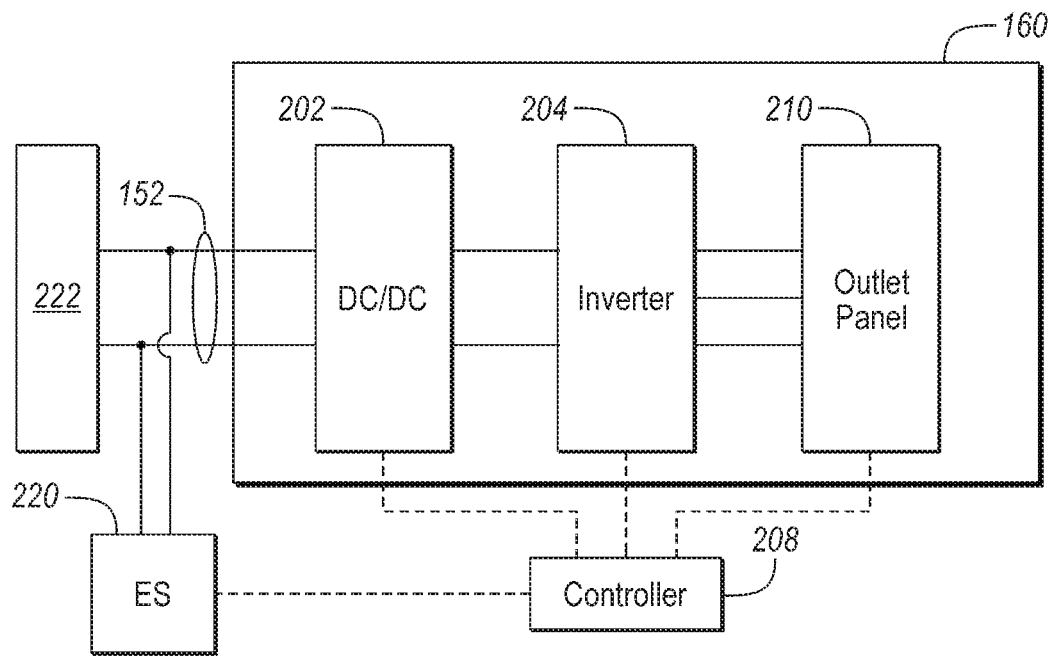
FIG. 2. depicts a possible configuration for a vehicle system for interfacing with an outlet panel.

FIG. 2 depicts a possible configuration including the OBGI system 160. The OBGI system 160 may include a DC/DC power converter 202 that provides power to an inverter 204. In some configurations, the function of the DC/DC power converter 202 may be provided by the DC/DC converter module 128 that powers the low-voltage bus 154. The inverter 204 may be configured to convert a DC voltage input to an alternating current (AC) voltage output. The DC/DC power converter 202 may be configured to adjust the voltage level of the traction battery 124 to a voltage level used by the inverter 204. The inverter 204 may be configured to provide one or more voltage outputs. For example, the inverter 204 may be configured to provide three voltage outputs (e.g., three-phase inverter). In some configurations, the OBGI system 160 may be configured to utilize existing DC/DC converters and inverters that are in the vehicle (e.g., DC/DC converter module 128 and Power Electronics Module 126). The vehicle may include a controller 208 that is configured to operate the components of the OBGI system 160 including the DC/DC converter 202 and the inverter 204. In some configurations, the controller 208 may be part of the OBGI system 160.

Power sources 222 may supply power to the high-voltage bus 152. The power sources 222 may include the traction battery 124 and the electric machines 114 operating as generators driven by the engine 118. The power sources 222 may include any component configured to provide power to the high-voltage bus 152. The vehicle may further include various electrical systems 220. The electrical systems 220 may include electrical components that draw power from the high-voltage bus 152 (e.g., electric machines 114, DC-DC converter module 128, electrical loads 146, brake system 150). While the OBGI system 260 draws power from the high-voltage bus 152, it may be considered as a separate electrical system. The controller 208 may be configured to operate the electrical systems 220 and/or affect operation of the electrical systems 220. The controller 208 may interact directly and/or indirectly with the electrical systems 220 to control an amount of power used. For example, the controller 208 may be in communication with the electrical systems 220 to set an amount of power that is available for the electrical systems 220. The controller 208 may operate in coordination with other controllers distributed in the vehicle to operate the electrical systems 220. Operating the electrical systems 220 may include controlling an amount of power used by the electrical systems 220. This may include limiting power draw for one or more of the electrical systems 220 to an amount that is less than a demanded power usage.

The DC/DC power converter 202 may include inputs that are electrically coupled to the high-voltage bus 152 and the traction battery 124. The DC/DC power converter 202 may be configured to convert the voltage level of the high-voltage bus 152 to a desired voltage input level for the inverter 204. The DC/DC power converter 202 may include a bypass mode in which the voltage of the high-voltage bus is transferred to the inputs of the inverter 204. The DC/DC power converter 202 may include switching devices and circuit elements that are arranged and controlled to output the desired voltage level. The switching devices may be controlled by a controller (e.g., controller 208) that sequences the switching according to the desired power output. The DC/DC power converter 202 may include boost modes of operation that output a voltage that is greater than the voltage of the high-voltage bus 152. The DC/DC power converter 202 may include buck modes of operation that output a voltage that is less than the voltage of the high-voltage bus 152.

The inverter 204 may be configured to provide one or more voltage/current outputs. The inverter 204 may be configured to convert a DC voltage input into one or more AC voltage outputs. The inverter 204 may be a three-phase inverter that is configured to provide three AC voltage/current waveforms. The inverter 204 may include power switching circuitry that includes a plurality of switching devices. The switching devices may be Insulated Gate Bipolar Junction Transistors (IGBTs) or other solid-state switching devices. The switching devices may be arranged to selectively couple a positive terminal and a negative terminal of the high-voltage bus 152 to each terminal or leg of the inverter power output. Each of the switching devices within the power switching circuitry may have an associated diode connected in parallel to provide a path for inductive current when the switching device is in a non-conducting state. Each of the switching devices may have a control terminal for controlling operation of the associated switching device. The control terminals may be electrically coupled to a controller. The controller may include associated circuitry to drive and monitor the control terminals. For example, the control terminals may be coupled to the gate input of the solid-state switching devices.

Each leg of the inverter 204 may include a first switching device that selectively couples the HV-bus positive terminal to the associated output terminal. A first diode may be coupled in parallel to the first switching device. A second switching device may selectively couple the HV-bus negative terminal to the associated output terminal. A second diode may be coupled in parallel to the second switching device. Each inverter output leg may be similarly configured. Each leg of the inverter 204 may be configured to control the voltage between the associated output terminal and a neutral terminal to a desired voltage magnitude and frequency.

The controller (e.g., 208) may be programmed to operate the switching devices to control the voltage and current at the phase outputs. The controller 208 may operate the switching devices so that each inverter output is coupled to only one of the HV-bus positive terminal or the HV-bus negative terminal at a particular time. Various power output algorithms and strategies are available to be implemented in the controller 208. The inverter outputs may be characterized by voltage magnitude, current magnitude, and frequency. The controller 208 may be programmed to operate the inverter 204 to achieve the desired voltage and current output waveform. The controller 208 may implement open-loop and/or closed loop strategies to achieve the result. The controller 208 may operate the switching devices with a pulse-width modulated (PWM) gate signal.

The inverter 204 may include current sensors for each inverter power output. The current sensors may be inductive or Hall-effect devices configured to generate a signal indicative of the current passing through the associated circuit. The controller 208 may sample the current sensors at a predetermined sampling rate.

The inverter 204 may include one or more voltage sensors. The voltage sensors may be configured to measure an input voltage to the inverter 204 and/or one or more of the output voltages of the inverter 204. The voltage sensors may be resistive networks and include isolation elements to separate high-voltage levels from the low-voltage system. In addition, the inverter 204 may include associated circuitry for scaling and filtering the signals from the current sensors and the voltage sensors.

In some configurations, the DC/DC power converter 202 and inverter 204 may be integrated as a single unit. The overall function may remain as described. The result is that the OBGI system 160 is configured to provide one or more power outputs for external devices. The controller 208 may be configured to operate the DC/DC power converter 202 and the inverter 204 to achieve the desired inverter power outputs.

The OBGI system 160 may include an outlet panel 210. Industrial and household systems generally use commonly available power connections. For example, household applications typically utilize 120 VAC electrical power. Other household applications may use 240 VAC electrical power. The outlet panel 210 may be designed to support both types of power connections. The outlet panel 210 may be electrically coupled to the inverter 204 and may be configured to receive power from the inverter 204.

Figure 3:
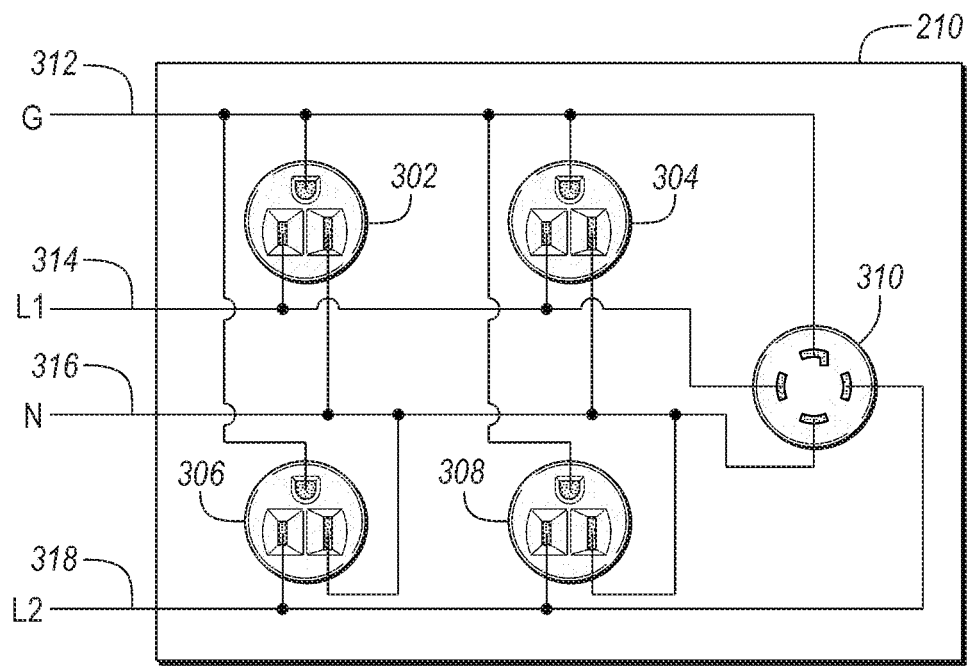
FIG. 3 depicts a possible power outlet configuration for the outlet panel.

FIG. 3 depicts a possible configuration for the outlet panel 210. The outlet panel 210 may include a first outlet receptacle 302, a second outlet receptacle 304, a third outlet receptacle 306, a fourth outlet receptacle 308, and a fifth outlet receptacle 310. The outlet receptacles may be standard electrical connection interfaces. For example, the first outlet receptacle 302 may be a household electrical receptacle that defines openings for receiving conductors of a mating electrical plug. Some of the outlet receptacles may be configured with three openings or connections. The connections may be defined as ground, neutral, and power. These outlet receptacles may be configured to connect an electrical load between the power and neutral connections. Some of the outlet receptacles (e.g., fifth outlet receptacle 310) may be configured with four openings or connections. The connections may be defined as ground, neutral, first power phase, and second power phase. These outlet receptacles may be configured to connect an electrical load between the first power phase and the second power phase. The receptacles may be configured to support plugs conforming to various local and international standards. For example, the outlet panels may be designed to accommodate plugs for a given country or region.

The electrical interface between the inverter 204 and the outlet panel 210 may include a ground connection (G) 312, a neutral connection (N) 316, a first inverter voltage output (L1) 314 and a second inverter voltage output (L2) 318. Each of the receptacles may have an associated ground conductor to which the ground connection 312 may be electrically coupled. Each of the receptacles may have a neutral conductor to which the neutral connection 316 may be electrically coupled. The neutral connection 316 may be electrically coupled to the HV-bus negative terminal of the inverter 204. The first inverter voltage output 314 and the second inverter voltage output 318 may be electrically coupled to outputs of the inverter 204. For example, the first inverter voltage output 314 and the second inverter voltage output 318 may be electrically coupled to separate power outputs of the inverter 204.

The first inverter voltage output 314 and the second inverter voltage output 318 may each be configured to output an AC voltage with a predetermined magnitude and a predetermined frequency (e.g., 120 VRMS at 60 Hz). The system may be easily configured to be compatible with other power grids by changing the voltage and frequency to match. The inverter 204 may be configured to have two phase outputs. That is, the inverter 204 may have two separate phase legs such that two inverter power outputs are available. The controller 208 may be programmed to operate the inverter 204 to output an AC voltage waveform for each of the inverter voltage outputs (L1 and L2).

The first inverter voltage output 314 may be electrically connected to a port of the first outlet receptacle 302 and a port of the second outlet receptacle 304. The controller 208 may be programmed to operate the inverter 204 so that a desired AC voltage is present between the first inverter voltage output 314 and the neutral connection 316. The power load on the first inverter voltage output 314 may be the sum of the power drawn by the first outlet receptacle 302 and the second outlet receptacle 304.

The second inverter voltage output 318 may be electrically connected to a port of the third outlet receptacle 306 and a port of the fourth outlet receptacle 308. The controller 208 may be programmed to operate the inverter 204 so that a desired AC voltage is present between the second inverter voltage output 318 and the neutral connection 316. The power load on the second inverter voltage output 318 may be the sum of the power drawn by the third outlet receptacle 306 and the fourth outlet receptacle 8

The first inverter voltage output 314 may be connected to a first port of the fifth outlet receptacle 310. The second inverter voltage output 318 may be connected to a second port of the fifth outlet receptacle 310. The fifth outlet receptacle 310 may include ports that are electrically connected to neutral connection 316 and the ground connection 312. The voltage across the first port and the second port may be the sum of the first inverter voltage output 314 and the second inverter voltage output 318. For example, when the first inverter voltage output 314 and the second inverter voltage output 318 are 120 VAC, the voltage across the first port and the second port may be 240 VAC. The power load on each of the first inverter voltage output 314 and the second inverter voltage output 318 may be one half of the power drawn by the fifth outlet receptacle 310.

Each of the receptacles may have an associated maximum power rating. The maximum power rating may be dependent upon the outlet capability. The maximum power rating may be dependent upon the wiring configuration and the inverter power capability. The maximum power rating may be dependent upon a fuse or circuit breaker rating. For example, the first outlet receptacle 302 and the second outlet receptacle 304 may each be configured to provide a predetermined current at a predetermined voltage (e.g., 120V). The maximum power per receptacle may be defined by the product of predetermined current and the predetermined voltage. The total power of the two receptacles may be the sum of the maximum power per receptacle (e.g., for two connected receptacles it is twice the power per receptacle). The first inverter voltage output 314 that powers the first outlet receptacle 302 and the second outlet receptacle 304 may be configured to provide up to a predetermined amount of power. In some configurations, the first inverter voltage output 314 may be configured to provide power to satisfy both connected receptacles drawing full power (e.g., total power of the two receptacles). In some configurations, the first inverter voltage output 314 may be configured to provide an amount of power that may be less than the total possible power draw (e.g., power of one receptacle).

The third outlet receptacle 306 and the fourth outlet receptacle 308 may each be configured to provide up to a predetermined current at a predetermined voltage. The second inverter voltage output 318 that powers the third outlet receptacle 306 and the fourth outlet receptacle 308 may be configured to provide up to a predetermined amount of power. In some configurations, the second inverter voltage output 318 may be configured to provide power to satisfy a total possible power for both connected receptacles drawing full power. In some configurations, the second inverter voltage output 318 may be configured to provide an amount of power that may be less than the total possible power draw (e.g., power for one receptacle). The power limit of each of the inverter voltage outputs may be depend upon the inverter design and requirements.

The fifth outlet receptacle 310 may be configured to provide a predetermined current at a predetermined voltage (e.g., 240V). The first inverter voltage output 314 and the second inverter voltage output 318 may each be configured provide half of the total power to supply the fifth outlet receptacle 310.

The outlet panel 210 may receive power from the power sources 222. The power sources 222 may be capable of delivering power up to a predetermined power limit. The maximum amount of power that the power sources 222 may provide may be limited. For example, the traction battery 124 may be operated within certain power limits to improve battery life. The traction battery 124 may have a maximum discharge power capability that defines how much power may be drawn from the traction battery 124. The electric machines 114 may have a power generation limit that depends on the rotational speed. The maximum power available may also be dependent upon the vehicle mode of operation. The controller 208 may be programmed to receive or compute the maximum power available at any given time.

The vehicle power system may be configured to prioritize power to the outlet panel 210. That is, the system may be configured to ensure that sufficient power is reserved for the outlet panel 210. This ensures that loads coupled to the outlet panel 210 may have an uninterrupted power supply regardless of how the other electrical systems 220 are operated. When prioritizing power to the outlet panel 210, the power system may reserve an amount of power that is equal to the maximum power that the outlet panel 210 can provide. The disadvantage of prioritizing the outlet panel 210 is that the power is reserved even if it is not being used or capable of being used. For example, there may be no devices plugged into the outlet panel 210. In these situations, power is reserved that may not be used. As such, less power is available for propulsion and other electrical systems.

An improvement may be to intelligently monitor the devices coupled to the outlet panel 210 and dynamically determine the amount of power to be reserved. The system may be configured to reserve power for the outlet panel 210 based on the presence of devices being plugged into the outlet panel 210. If no devices are plugged in, there may be no need to reserve power for the outlet panel 210. By eliminating the reserved power when there are no devices plugged in, more power is available for other electrical systems and functions (e.g., electric machines 114 for propulsion). Further, when devices are plugged in, the system may determine which receptacles are being used and reserve power according to the power specifications for the receptacles that are in use. In this case, power less than the maximum outlet panel power level may be reserved. In some configurations, the power reserved may depend upon the maximum power rating for the receptacles that are in use. In some configurations, the actual power drawn from each receptacle may be monitored and the reserve power may be set according to the actual power drawn. When power is reserved for the power outlets, a maximum power limit of the electrical systems may be decreased accordingly.

Figure 4:
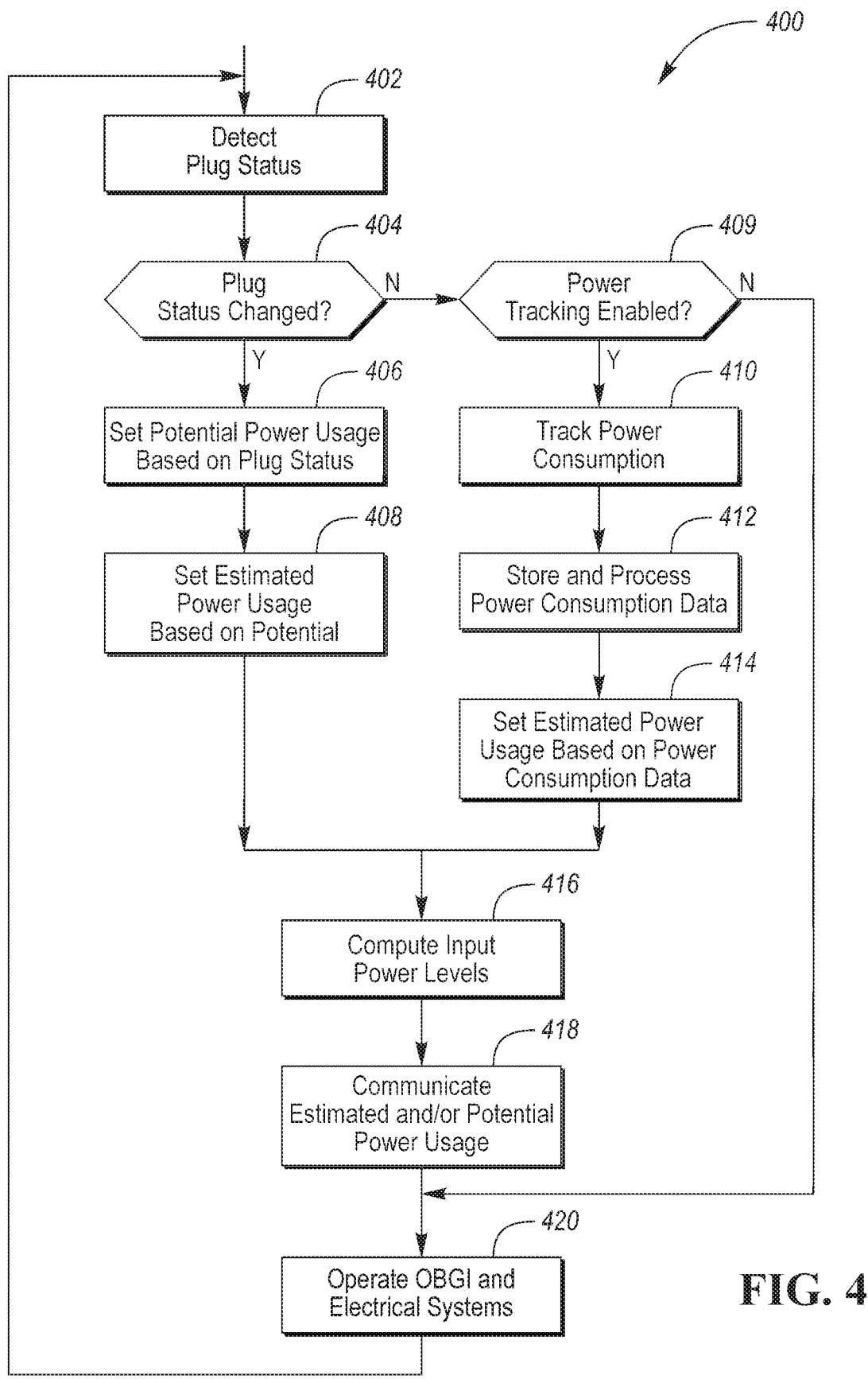
FIG. 4 is a flowchart of a possible sequence of operations for operating the vehicle electrical system.

FIG. 4 depicts a possible flowchart 400 for a set of operations that may be implemented in a controller (e.g., 208) for operating the OBGI system 160 and electrical systems 220 of the vehicle 112. The reserved power for the outlet panel 210 may be initialized to the maximum output panel power level to ensure that adequate power is available at startup if devices are plugged into each receptacle. Operation 402 may be performed to detect a plug status associated with each of the receptacles. The plug status may be indicative of a plug being inserted into the associated receptacle. The plug status may be determined in a variety of ways. In some configurations, each receptacle may have an associated switch that is engaged when a plug is inserted in the receptacle. The switch may provide an electrical signal to the controller 208. In some configurations, the plug status may be determined by monitoring the voltage and current at each receptacle. When there is no load, the current may be zero. The controller 208 may be programmed to detect a load if the current exceeds a predetermined current.

At operation 404, a check may be performed to determine if the plug status has changed. The plug status may have changed if the plug status indicates a changed state. For example, the plug status may indicate a change from a receptacle being empty to a receptacle having a device plugged in. If the plug status has changed, operation 406 may be performed.

At operation 406, the potential power usage is set or updated. The potential power usage may represent a maximum amount of power that may be drawn from the receptacles or set of receptacles that are in use (e.g., a device plugged in). The potential output power usage may be a sum of the maximum power that may be utilized by each receptacle in which a plug is detected. For example, the system may be configured such that each inverter voltage output can supply power in an amount to satisfy the maximum power demand of all connected receptacles (e.g., maximum possible power to each connected outlet). In this configuration, the potential output power usage may be zero, the total power for one plugged in device, or the total power for two plugged in devices, depending on how many devices are plugged in. In some configurations, the potential output power usage may be the maximum power that can be provided by the associated inverter voltage output. For example, a system may be configured such that the inverter voltage output can supply an amount of power that is less than the maximum power demand of all connected receptacles. In this configuration, the potential power usage may be zero (e.g., no device plugged in) or the maximum inverter output power (e.g., one or two devices plugged in).

The controller 208 may check the plug status associated with the first and second outlet receptacles and update the potential output power usage accordingly. The controller 208 may check the plug status associated with the third and fourth receptacles and update the potential output power usage accordingly. The plug status for the fifth outlet receptacle may be checked and the potential output power usage may be set accordingly. The potential output power usage may be a sum of the maximum possible power draws of each of the receptacles with devices plugged in. The potential output power usage may have discrete values depending on the combination of receptacles being used. The discrete power levels depend on the configuration of the power system and outlet panels. The potential output power usage may be limited to a maximum inverter output capability.

At operation 408, an estimated output power usage may be initialized to the potential output power usage value. After a change in the plug status, the potential output power usage value may provide a more conservative estimate of the power needed. Since the plug status has just changed, there is no historical power consumption data for any recently plugged-in device. The estimated output power usage is described later. In general, the estimated output power usage and the potential output power usage may define operational boundaries for the power. After a plug status change, both quantities may be set to the same value.

If the plug status has not changed at operation 404, operation 409 may be performed. At operation 409, a check may be performed to determine if power tracking is enabled. The power tracking feature may be a configurable option. The power tracking feature may be enabled in configurations in which the voltage and current associated with the receptacles can be measured (e.g., voltage and current sensors are available and working). The power tracking feature may be dynamically enabled or disabled based on the availability of the voltage and current sensor data. For example, in the event of a voltage or current sensor malfunction, the power tracking feature may be disabled. The power tracking feature may permit tracking the actual power consumption of connected receptacles and predicted the power draw for each receptacle based on the historical power consumption data. If power tracking is not enabled, then operation 420 may be performed. That is, the power tracking features may be bypassed or not performed.

If the power tracking is determined to be enabled at operation 409, operation 410 may be performed. At operation 410, the controller may track and/or monitor output power consumption for each of the receptacles. The controller 208 may measure the voltage and current associated with each of the receptacles or the inverter outputs. The controller 208 may compute the output power from the voltage and current. The controller 208 may collect power data over time. The controller 208 may save the output power data as historical power consumption data. For example, the controller 208 may maintain and store a buffer of historical output power consumption data from earlier in an ignition cycle as well as historical output power data from previous ignition cycles. The historical data may be processed in a variety of ways. For example, an average of the historical output power data and/or a maximum power consumption value of the historical output power data may be computed for each receptacle and/or inverter voltage output.

At operation 412, the controller may store and process the maximum power consumption for each of the receptacles and/or inverter voltage outputs. The maximum power consumption may be derived from the historical output power data as the maximum of the power consumption values over a predetermined time interval. Although the power outlet may be rated to provide a maximum amount of power, the load that is plugged in may draw less than the maximum amount of power. The power consumption data may also be averaged or filtered over a predetermined interval of time. The controller may generate an estimated future power consumption based on a maximum power value of the historical power consumption data and/or an average power value of the historical power consumption data.

At operation 414, the estimated power usage/consumption may be set or updated based on the historical output power data. The estimated power usage/consumption value may be a predicted power consumption associated with the receptacles. For example, the estimated power usage for each of the receptacles may be set to the maximum power consumption over the predetermined time period. In other configurations, the estimated power usage may be an average value of the historical output power consumption values. The average value may provide a lower value than the maximum power consumption value. In addition, the average value may provide a more likely power consumption value. For example, the maximum observed value may occur for short periods of time such as initial load startup.

At operation 416, the controller 208 may compute the input power levels. The input power levels may be the amount of power required at the input to the OBGI system 160. The power drawn by the receptacles is to be provided by the power sources 222. However, the amount of power to be provided may be different than the power consumed. For example, the power system may have an associated efficiency in providing power to the receptacles (e.g., power provision efficiency factor). The power provision efficiency factor may include an efficiency factor associated with DC/DC and DC/AC power conversion. The controller 208 may adjust he power provision efficiency factor based on temperature and current. The input power level may consider the efficiency of the delivery path. That is, the amount of power reserved for input to the OBGI system may compensate for the efficiency of the power generation system from power source 222 to the outlet panel 210.

At operation 418, the estimated and potential input power requirements may be communicated or output to the power system. In some configurations, the value may be transferred over the vehicle network to a vehicle system controller that manages the power system.

At operation 420, the OBGI system 160 and the electrical systems 220 may be operated according to the input power requirements. Operating the electrical systems 220 may include controlling an amount of power drawn by the vehicle electrical systems according to the input power requirement values. The electrical systems 220 may be operated according to a maximum power limit that changes based on the power reserved for the OBGI system 160. When the OBGI system 160 is capable of drawing power, the maximum power limit may be reduced or decreased. The power system may reserve an amount of power for the OBGI system 160 based on the potential and estimated input power requirements. A confidence level may be associated with each of the input power values. The confidence level may be indicative of a likelihood that the reserved power level may not be exceeded. The confidence value associated with the potential power consumption value may be relatively high since this power value is based on the maximum receptacle power capability. For this reason, the potential power consumption value may also be referred to as the guaranteed power limit. The confidence value associated with the estimated power consumption may be relatively lower since this power value is based on actual power measurements. The controller 208 may be programmed to compute a confidence value based on the distribution of the historical power data. The confidence value may further depend upon the variance of the historical power data. The controller 208 may output the confidence values to other controllers connected to the vehicle network.

When power tracking is not enabled, the system may operate by reserving an amount of power for to receptacles as the potential power usage based on the plug status. The potential power usage may be a maximum power associated with the receptacles. This mode of operation ensures that sufficient power is reserved for the OBGI system to support the connected devices. In addition, this mode of operation can be implemented without knowing the actual power consumption of the receptacles. In general, unless the connected load is drawing the maximum power that is reserved, more power may be reserved than is necessary. When power tracking is enabled, the system may operate by reserving an amount of power for the receptacles as a predicted power usage based on historical power consumption data. During periods immediately following a plug status change, the reserved power may be raised to the maximum power associated with the receptacles. This ensures that the power draw may be satisfied until the system is able to relearn and predict a power consumption level from the historical power consumption data. When the predicted power consumption level is determined, the amount of power reserved may be changed to the predicted power consumption value. This mode of operation may depend upon being able to measure the historical power consumption data.

The vehicle power system may reserve an amount of power based on the potential power consumption value and the estimated power consumption value. The vehicle power system reserves the amount of power by limiting the power supplied to other vehicle electrical systems. The vehicle power system may compute the total amount of power that is available at a given time. The total amount of power may include power that can provided by the traction battery 124 and the electric machines 114 operating as generators. The vehicle power system may then compute an amount of power available for vehicle electrical systems as the difference between the total amount of power available and the potential power consumption value or the estimated power consumption value. Power consumption by vehicle electrical systems may then be limited to the amount of power available for vehicle systems.

The vehicle power system may also be configured to dynamically adjust the reserved power. The vehicle power system may monitor a power demand for the vehicle electrical systems. The vehicle power system may determine a first power available as the difference between the total amount of power available and the potential power consumption value. If the power demand is less than the first power available, then there is a power reserve greater than the potential power consumption level. In this case, all vehicle electrical systems may receive the demanded amount of power without limit. If the power demand exceeds the first power available, then the vehicle electrical system power demand may be limited to the first available power. This may also trigger a load shedding operation in which one or more electrical loads are selected to operate at a lower power level. For example, some electrical loads or systems may be turned off for a period of time. The vehicle power system may implement a prioritization algorithm to determine which electrical systems are limited. For example, the vehicle power system may be configured to maintain power levels for safety-related electrical systems (e.g., high-priority).

The vehicle power system may also determine a second power available as the difference between the total amount of power available and the estimated power consumption value. If the power demand is between the first available power and the second available power, the power demand may be unchanged. Power reserved for the outlet panel is at least equal to the estimated power consumption value. This mode of operation may be conditioned on a confidence value of the estimated power consumption value. For example, this mode may be possible when the confidence value exceeds a predetermined threshold. If the power demand exceeds the second available power, then the vehicle power demand may be limited to the second available power. This may trigger the previously described load shedding operation.

With no devices plugged into the receptacles, the vehicle power system may operate such that all vehicle power is available to the electrical systems. Responsive to detecting a load connected to any of the power outlets, the vehicle power system may decrease power available to the electrical systems by a predicted power consumption associated with the power outlets in use (e.g., power tracking enabled). In some configurations, the vehicle power system may decrease power available to the electrical systems by a maximum power associated with the power outlets in use (e.g., power tracking not enabled). The total decrease in power available to the electrical systems may be limited to a maximum outlet power allocation. The maximum outlet power allocation may be an amount of power designated for the OBGI system.

The systems and methods described provide consistent operation of the outlet panel. Devices may be plugged in and draw power from the outlet panel and the system can provide adequate power for the devices. The system provides better energy utilization by determining the potential power use and not reserving more power than is necessary. This leaves more power for vehicle systems and makes more power available for propulsion.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   power outlets configured to receive power from an inverter and including receptacles configured to receive a mating electrical plug; and
   power sources configured to supply power to the inverter and a plurality of electrical systems; and
   a controller programmed to, responsive to detecting a load connected to one of the power outlets, reduce a maximum power limit of the electrical systems by a maximum power associated with the one of the power outlets, wherein the maximum power includes a power provision efficiency factor to compensate for energy conversion efficiency between the power sources and the power outlets.

2. The vehicle of claim 1 wherein the controller is further programmed to, responsive to detecting no loads connected to the power outlets, operate the electrical systems to increase the maximum power limit of the electrical systems.

3. The vehicle of claim 1 wherein the controller is further programmed to, responsive to a total decrease in the maximum power limit exceeding a maximum outlet power allocation, limit the total decrease in the maximum power limit to be the maximum outlet power allocation.

4. The vehicle of claim 1 wherein the controller is further programmed to process historical power consumption data for each of the power outlets and output an estimated future power consumption based on the historical power consumption data.

5. The vehicle of claim 4 wherein the controller is further programmed to operate the electrical systems to change the maximum power limit of the electrical systems according to the estimated future power consumption.

6. The vehicle of claim 4 wherein the controller is further programmed to generate the estimated future power consumption as a maximum power consumption value derived from the historical power consumption data over a predetermined time interval.

7. The vehicle of claim 4 wherein the controller is further programmed to generate the estimated future power consumption as an average power consumption value derived from the historical power consumption data over a predetermined interval.

8. A vehicle comprising:
   power outlets configured to receive power from an inverter; and
   power sources configured to supply power to the inverter and a plurality of electrical systems; and
   a controller programmed to, responsive to detecting a load connected to one of the power outlets, reduce a maximum power limit of the electrical systems by a maximum power associated with the one of the power outlets wherein the maximum power includes a power provision efficiency factor to compensate for energy conversion efficiency between the power sources and the power outlets.

9. The vehicle of claim 8 wherein the power provision efficiency factor varies with temperature and current.

10. A vehicle comprising:
    power outlets configured to receive power provided by an inverter;
    power sources configured to supply power to the inverter and a plurality of electrical systems; and
    a controller programmed to, responsive to detecting a load connected to one of the power outlets, decrease a maximum power limit of the electrical systems by a predicted power consumption associated with the one of the power outlets, wherein the controller is further programmed to include a power provision efficiency factor in the predicted power consumption.

11. The vehicle of claim 10 wherein the predicted power consumption is based on historical power consumption data associated with the one of the power outlets.

12. The vehicle of claim 11 wherein the predicted power consumption is a maximum power consumption value derived from the historical power consumption data over a predetermined time interval.

13. The vehicle of claim 11 wherein the predicted power consumption is an average power consumption value derived from the historical power consumption data over a predetermined interval.

14. The vehicle of claim 10 wherein the controller is further programmed to, responsive to detecting a change of status to the one of the power outlets, decrease the maximum power limit of the electrical systems according to a maximum power associated with the one of the power outlets.

* * * * *